United States Patent
Shomura et al.

(10) Patent No.: US 8,427,968 B2
(45) Date of Patent: Apr. 23, 2013

(54) COMMUNICATION DATA STATISTICAL APPARATUS, COMMUNICATION DATA STATISTICAL METHOD, AND COMPUTER PROGRAM PRODUCT

(75) Inventors: Yusuke Shomura, Yokohama (JP); Yoshinori Watanabe, Chigasaki (JP)

(73) Assignee: Alaxala Networks Corporation, Kawasaki (JP)

( * ) Notice: Subject to any disclaimer, the term of this patent is extended or adjusted under 35 U.S.C. 154(b) by 107 days.

(21) Appl. No.: 12/483,679

(22) Filed: Jun. 12, 2009

(65) Prior Publication Data

US 2010/0034109 A1 Feb. 11, 2010

(30) Foreign Application Priority Data

Aug. 6, 2008 (JP) ................................. 2008-202886

(51) Int. Cl.
| | |
|---|---|
| G01R 31/08 | (2006.01) |
| G06F 11/00 | (2006.01) |
| G08C 15/00 | (2006.01) |
| H04L 1/00 | (2006.01) |
| H04L 12/26 | (2006.01) |
| H04J 3/14 | (2006.01) |
| H04J 1/16 | (2006.01) |

(52) U.S. Cl.
USPC ....................................................... 370/252

(58) Field of Classification Search .................. 370/294, 370/252
See application file for complete search history.

(56) References Cited

U.S. PATENT DOCUMENTS

| | | | |
|---|---|---|---|
| 2005/0276230 A1* | 12/2005 | Akahane et al. | 370/252 |
| 2006/0114924 A1* | 6/2006 | Yazaki et al. | 370/428 |
| 2007/0008888 A1* | 1/2007 | Chawla et al. | 370/230 |
| 2007/0115850 A1* | 5/2007 | Tsuchiya et al. | 370/252 |

FOREIGN PATENT DOCUMENTS

| | | |
|---|---|---|
| JP | 2008-136012 A | 6/2005 |
| JP | 2006-5402 A | 1/2006 |
| JP | 2006-314077 A | 11/2006 |
| JP | 2006-319693 A | 11/2006 |
| JP | 2006-352831 A | 12/2006 |
| JP | 2007-208574 A | 8/2007 |
| JP | 2007-208575 A | 8/2007 |
| JP | 2007-336512 A | 12/2007 |
| JP | 2008-113409 A | 5/2008 |
| JP | 2008-258996 A | 10/2008 |
| JP | 2009-27400 A | 2/2009 |

* cited by examiner

*Primary Examiner* — Huy D Vu
*Assistant Examiner* — Adnan Baig
(74) *Attorney, Agent, or Firm* — Mattingly & Malur, PC

(57) ABSTRACT

An apparatus has a receiver module configured to receive packets including multiple different identifiers, an aggregation module configured to classify each packet, which is received by the receiver module into a certain aggregate flow and generate aggregate statistical information including number of packets belonging to the certain aggregate flow, and a statistical processing module configured to perform an updating process arranged to classify the certain aggregate flow into a specific statistical flow and to update statistical information including number of packets belonging to the specific statistical flow based on corresponding aggregate statistical information, the statistical processing module repeating the updating process for multiple aggregate flows, into which packets are classified by the aggregation module, so as to update the statistical information in each of the multiple different statistical conditions.

6 Claims, 15 Drawing Sheets

Fig.3

Aggregation Table 221

| Entry Number | Aggregate Flow Identification Condition | | | | | | | Statistical Information | | | | |
|---|---|---|---|---|---|---|---|---|---|---|---|---|
| | VLAN ID (VIP) | Source IP Address (SIP) | Destination IP Address (DIP) | Upper Protocol (PRT) | Source Port Number (SPT) | Destination Port Number (DPT) | Miscellaneous | Packet Number | Byte Number | Start Time | Last Update Time | Miscellaneous |
| 1 | V1 | IP_S1 | IP_D1 | TCP | SPORT1 | DPORT1 | * | | | | | |
| 2 | V2 | IP_S2 | IP_D2 | TCP | SPORT2 | DPORT2 | * | | | | | |
| 3 | | | | | | | | | | | | |
| ... | | | | | | | | | | | | |
| N | | | | | | | | | | | | |

Fig.4A

SIP Table 231

| Entry Number | Statistical Flow Identification Condition | Statistical Information | | | | | | |
|---|---|---|---|---|---|---|---|---|
| | SIP | Packet Number | Byte Number | Start Time | Last Update Time | Variant Number | | Miscellaneous |
| | | | | | | DIP | | |
| E1-1 | X1 | | | | | | | |
| E1-2 | X2 | | | | | | | |
| | | | | | | | | |

Fig.4B

SIP-DIP Table 232

| Entry Number | Statistical Flow Identification Condition | | Statistical Information | | | | | |
|---|---|---|---|---|---|---|---|---|
| | SIP | DIP | Packet Number | Byte Number | Start Time | Last Update Time | Variant Number | Miscellaneous |
| | | | | | | | DPT | |
| E3-1 | X1 | Y1 | | | | | | |
| E3-2 | X2 | Y2 | | | | | | |
| | | | | | | | | |

Fig.4C

SIP-DIP-DPT Table 233

| Entry Number | Statistical Flow Identification Condition | | | Statistical Information | | | | |
|---|---|---|---|---|---|---|---|---|
| | SIP | DIP | DPT | Packet Number | Byte Number | Start Time | Last Update Time | Miscellaneous |
| E4-1 | X1 | Y1 | B1 | | | | | |
| E4-2 | X2 | Y2 | B2 | | | | | |
| | | | | | | | | |

| Aggregate Flow Identification Condition | | | | | | Statistical Information | | | | |
|---|---|---|---|---|---|---|---|---|---|---|
| VID | SIP | DIP | PRT | SPT | DPT | Packet Number | Byte Number | Number of SYN-Flagged Packets | Start Time | Last Time |
| Z | A | B | TCP | X | Y | 10 | 100 | 1 | 0 | 50 |

SIP → 702

| Aggregate Flow Identification Condition | | | | | | Statistical Information | | | | |
|---|---|---|---|---|---|---|---|---|---|---|
| VID | SIP | DIP | PRT | SPT | DPT | Packet Number | Byte Number | Number of SYN-Flagged Packets | Start Time | Last Time |
|  | A |  |  |  |  | 10 | 100 | 1 | 0 | 50 |

SIP-DIP → 703

| Aggregate Flow Identification Condition | | | | | | Statistical Information | | | | |
|---|---|---|---|---|---|---|---|---|---|---|
| VID | SIP | DIP | PRT | SPT | DPT | Packet Number | Byte Number | Number of SYN-Flagged Packets | Start Time | Last Time |
|  | A | B |  |  |  | 10 | 100 | 1 | 0 | 50 |

SIP-DIP-DPT → 704

| Aggregate Flow Identification Condition | | | | | | Statistical Information | | | | |
|---|---|---|---|---|---|---|---|---|---|---|
| VID | SIP | DIP | PRT | SPT | DPT | Packet Number | Byte Number | Number of SYN-Flagged Packets | Start Time | Last Time |
|  | A | B |  |  | Y | 10 | 100 | 1 | 0 | 50 |

COMMUNICATION DATA STATISTICAL APPARATUS, COMMUNICATION DATA STATISTICAL METHOD, AND COMPUTER PROGRAM PRODUCT

CROSS REFERENCE TO RELATED APPLICATIONS

This application relates to and claims priority from Japanese Patent Application No. 2008-202886 filed on Aug. 6, 2008, the entire disclosure is incorporated herein by reference.

BACKGROUND

1. Technical Field

The present invention relates to a technique of taking statistics of communication data flowing through a network.

2. Description of the Related Art

As the Internet is widely used as the essential social infrastructure, in addition to the conventional best-effort type data communication, there is communication of various data, such as audio data, animation data, and transaction data of mission-critical tasks, that require the assurance of high communication quality. With widespread use of the ADSL (Asymmetric Digital Subscriber Line) technique and FTTH (Fiber To The Home) technique, access lines for broadband are generally used to increase the communication traffic.

In such circumstances, telecommunication carriers and Internet service providers require the technique of taking statistics of communication data flowing through a network, in order to assess the status of communication in the network. There is especially a high demand for the technique of taking statistics of communication data in each flow, which is classified by, for example, the source and the destination of communication data, the application used, and the quality level.

One proposed technique of taking statistics of communication data for each flow is a cache flow statistical technique disclosed in Japanese Patent Laid-Open No. 2006-5402. This proposed technique obtains a preset combination of identifiers (for example, a source address, a destination address, a source port number, and a destination port number) from header information of each received packet and counts up the number of packets having identical values of the respective identifiers in the preset combination, so as to sum up the communication traffic for each flow.

One proposed technique of collecting statistical information on a high-speed line is disclosed in Japanese Patent Laid-Open No. 2006-352831. This proposed technique accumulates information to be updated up to a preset number and collectively performs reading data from a memory, updating statistical information, and writing data into the memory, thus enhancing the speed of statistical operation.

The cache flow statistical technique disclosed in the former cited reference analyzes header information on reception of every packet. This technique advantageously has the extremely high capability of flow analysis. The technique, however, requires analyses of the header information for all the received packages and storage of the results of analyses into a memory. With increase of line speed to 40 Gbps or further to 100 Gbps, the access rate to the memory makes it difficult to record the required statistical information into the memory.

The speed-up technique of the statistical operation disclosed in the latter cited reference accumulates the statistical information in the buffer for the purpose of collective update. The statistical operation of diverse flows, however, has the following problems. For example, in application of a relatively low-capacity buffer, even a small number of flows fully occupy the capacity of the buffer, so that only a little amount of information is accumulated in the buffer. There is accordingly little speed-up effect by accumulation of information. The speed-up technique of the statistical operation gives only the overhead reduction effect of the statistical updating.

SUMMARY

The subject of this invention is directed to providing a technique to increase the speed of statistical operations, thereby enabling statistics of communication data to be taken even in high-speed communication lines.

One aspect of the invention provides an apparatus configured to take statistics of multiple different statistical conditions for communication data flowing through a network. The apparatus comprises a receiver module configured to receive packets including multiple different identifiers, an aggregation module configured to classify each packet, which is received by the receiver module and has corresponding identifiers identical with preset at least two different identifiers selected among the multiple different identifiers, into a certain aggregate flow and generate aggregate statistical information including number of packets belonging to the certain aggregate flow, and a statistical processing module configured to perform an updating process arranged to classify the certain aggregate flow into a specific statistical flow having a corresponding identifier identical with preset at least one identifier that defines one statistical condition among the multiple different statistical conditions and to update statistical information including number of packets belonging to the specific statistical flow based on corresponding aggregate statistical information, the statistical processing module repeating the updating process for multiple aggregate flows, into which packets are classified by the aggregation module, so as to update the statistical information in each of the multiple different statistical conditions.

The apparatus according to this aspect of the invention is configured to take statistics of the multiple different statistical conditions for the communication data flowing through the network. The apparatus of this aspect is designed to classify each received packet into one of preset aggregate flows, generate the aggregate statistical information of each aggregate flow, and update the statistical information of each statistical flow based on the aggregate statistical information of a corresponding aggregate flow. This updating process is performed with regard to the multiple different statistical conditions. The communication data statistical apparatus of this configuration desirably reduces the frequency of updating the statistical information of each aggregate flow, compared with the prior art technique of, in response to reception of every packet, updating statistical information of each statistical flow in the received packet with regard to multiple statistical conditions. The arrangement of the invention effectively reduces the number of accesses to a memory that records the statistical information and increases the speed of statistical operation, thus enabling statistics of communication data to be taken even in high-speed communication lines.

With this communication data statistical apparatus, the statistical processing module repeatedly performs the updating process of updating the statistical information of each statistical flow based on the aggregate statistical information corresponding to a preset number of aggregate flows with regard to each statistical condition, and repeats the updating process for the multiple different statistical conditions, so as to update the statistical information in each of the multiple different statistical conditions.

The communication data statistical apparatus of this application sequentially updates the statistical information of each statistical flow based on the aggregate statistical information of the multiple aggregate flows with regard to one statistical condition. During update of the statistical information with regard to a certain statistical condition, a cache memory can thus be occupied by the statistical information of the certain statistical condition. This arrangement desirably enhances the cache hit rate and increases the speed of statistical operation, thus enabling statistics of communication data to be taken even in high-speed communication lines.

The invention is not restricted to the communication data statistical apparatus described above but is also actualized by a communication data statistical method or a corresponding computer program product. The computer program product includes a computer readable recording medium. Typical examples of the computer readable recording medium are flexible disks, CD-ROMs, DVD-ROMs, magneto-optical disks, memory cards, and hard disks. These and other objects, features, aspects, and advantages of the present invention will become more apparent from the following detailed description of the preferred embodiments with the accompanying drawings.

BRIEF DESCRIPTION OF THE DRAWINGS

FIG. 3 is an explanatory view showing the structure of an aggregation table;

FIGS. 4A through 4C are explanatory views showing the structures of statistical flow tables;

FIG. 7 is an explanatory view conceptually showing one combination of identifiers extracted by a combination extractor;

Some modes of carrying out the invention are discussed below as preferred embodiments with reference to the accompanied drawings.

DESCRIPTION OF THE PREFERRED EMBODIMENTS

A. First Embodiment

A-1. System Configuration of First Embodiment

Figure 1:
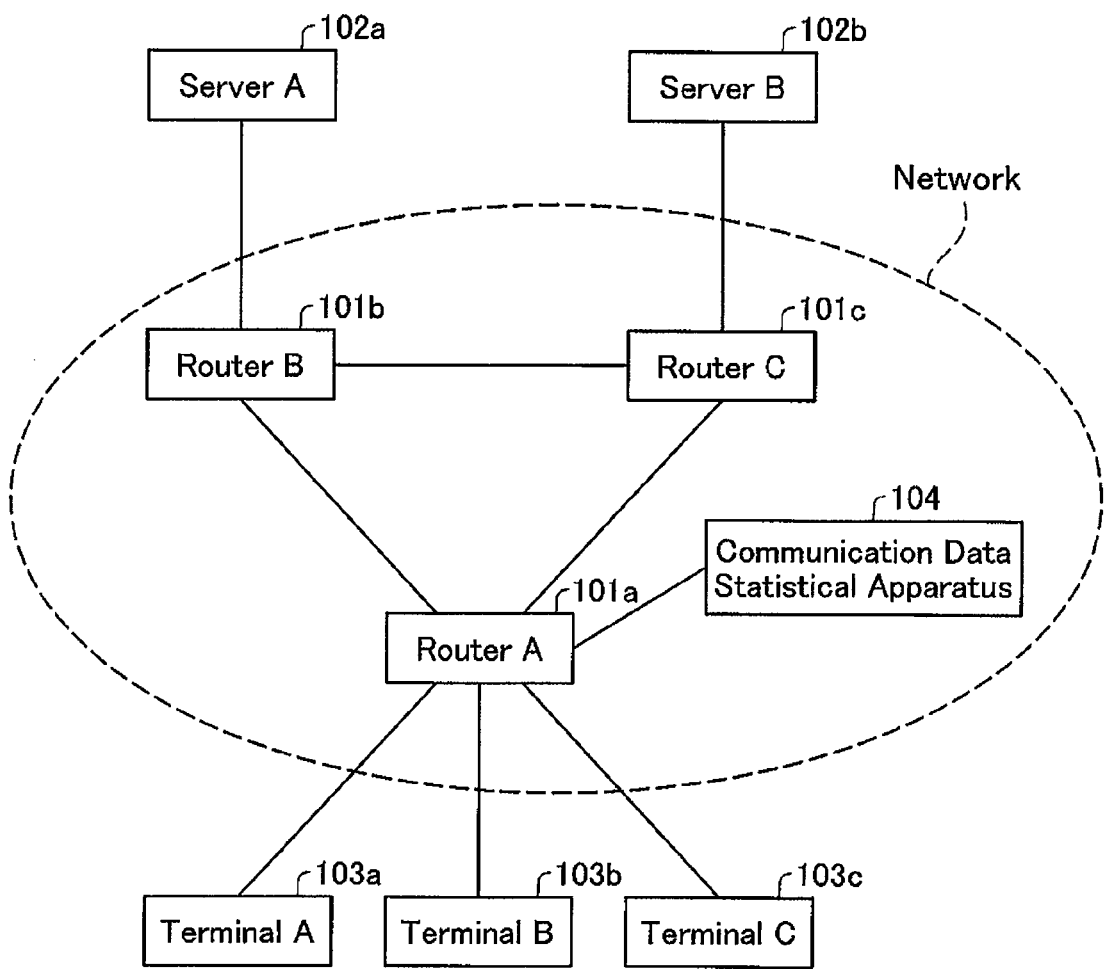
FIG. 1 is an explanatory view schematically illustrating a network system configuration including a communication data statistical apparatus in a first embodiment of the invention.

FIG. 1 schematically illustrates a network system configuration including a communication data statistical apparatus 104 in a first embodiment of the invention. As illustrated, the network system configuration of the embodiment includes routers 101$a$ through 101$c$ interconnected to relay packets, a server 102$a$ connected with the router 101$b$, a server 102$b$ connected with the router 101$c$, the communication data statistical apparatus 104 connected with the router 101$a$, and terminal devices 103$a$ through 103$c$ connected with the router 101$a$. The router 101$a$ adopts the mirroring technique or the sFlow technique defined in RFC3176 to send copies of the relayed packets (traffic) to the communication data statistical apparatus 104.

The respective packets include multiple identifiers. Typical examples of the identifiers are a source IP (Internet Protocol) address, a destination IP address, an upper protocol, a source port number, and a destination port number. These are called 5-tuples. Other examples of the identifier include a VLAN (Virtual LAN or Local Area Network) ID (Identification), a source MAC (Media Access Control) address, and a destination MAC address.

The communication data statistical apparatus 104 of this embodiment is designed to receive packets from the router 101$a$ and output three different types of statistical data having different statistical conditions. Each statistical condition is defined by a combination of the identifiers mentioned above. The administrator managing and controlling the communication data statistical apparatus 104 is allowed to arbitrarily set the combination of the identifiers.

In the embodiment, the source IP address (SIP) is the identifier defining a first statistical condition. The source IP address (SIP) and the destination IP address (DIP) are the combination of the identifiers defining a second statistical condition. The source IP address (SIP), the destination IP address (DIP), and the destination port number (DPT) are the combination of the identifiers defining a third statistical condition. A set of packets having the identical identifiers for defining the statistical condition is called a 'statistical flow'. The communication data statistical apparatus 104 classifies packets into statistical flows corresponding to the respective statistical conditions and takes statistics including an operation of counting the number of packets, discussed later in detail.

A-1-1. Structure of Communication Data Statistical Apparatus

Figure 2:
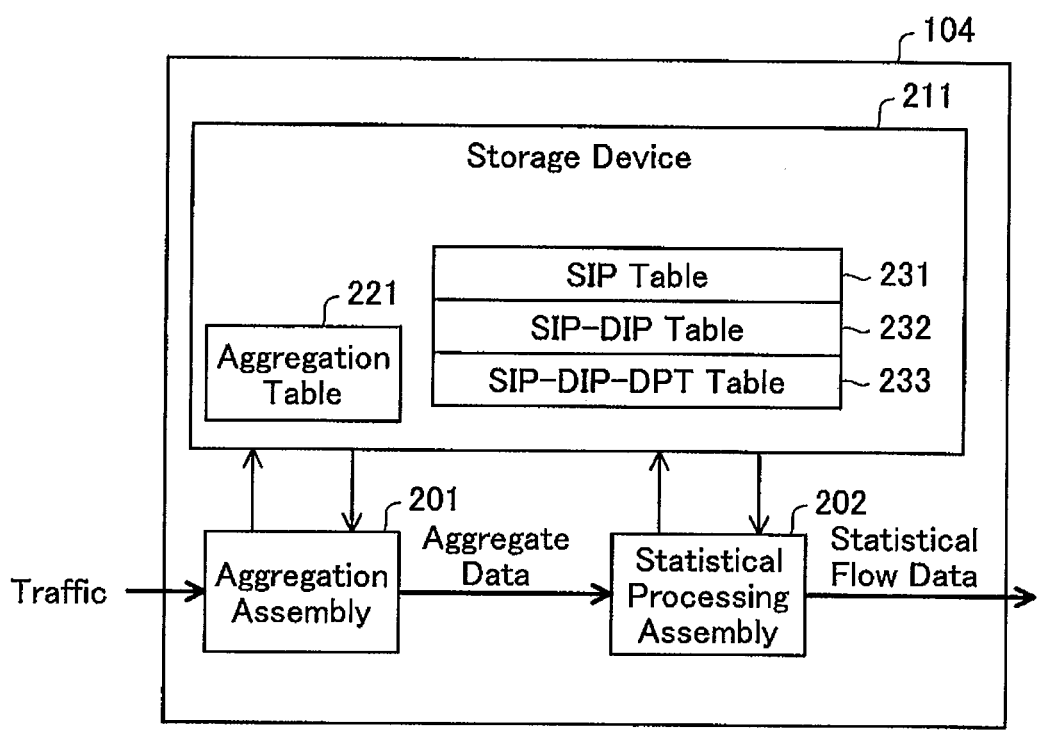
FIG. 2 is a functional block diagram showing the schematic structure of the communication data statistical apparatus.

FIG. 2 is a functional block diagram showing the schematic structure of the communication data statistical apparatus 104 of this embodiment. As illustrated, the communication data statistical apparatus 104 of this embodiment includes an aggregation assembly 201, a statistical processing assembly 202, and a storage device 211.

The storage device 211 stores an aggregation table 221, an SIP table 231, an SIP-DIP table 232, and an SIP-DIP-DPT table 233. In the description herein, the SIP table 231, the SIP-DIP table 232, and the SIP-DIP-DPT table 233 may collectively be referred to as 'statistical flow tables'. The aggregation table 221 and the statistical flow tables will be discussed later in detail. The storage device 211 may be a generally used SDRAM or an RLDRAM with reduced access latency.

In the system configuration of this embodiment, the three statistical flow tables are created corresponding to the three statistical conditions of the statistical data output from the communication data statistical apparatus 104. The number of the statistical flow tables and the combination of the identifiers defining the respective statistical conditions are, however, not restricted to those described in the embodiment. Other statistical flow tables may be created by other combinations of the identifiers.

The aggregation assembly 201 receives packets from the router 101a, classifies received packets into 'aggregate flows', and takes statistics of the respective aggregate flows, including a statistical operation of counting the number of packets, prior to classifying the received packets into statistical flows and taking statistics of the respective statistical flows. The 'aggregate flow' is defined by a combination of all the identifiers defining the respective statistical conditions. The aggregation assembly 201 outputs 'aggregate data' representing the result of the statistics to the statistical processing assembly 202. Namely the aggregation assembly 201 receives packets from the router 101a and updates the aggregation table 221.

The statistical processing assembly 202 takes statistics of the statistical flows, based on the aggregate data input from the aggregation assembly 201. Namely the statistical processing assembly 202 updates the statistical flow tables, based on the aggregate data input from the aggregation assembly 201. The statistical processing assembly 202 of the embodiment is equivalent to the 'statistical processing module' in the claims of the invention. The aggregation assembly 201 and the statistical processing assembly 202 will be discussed later in detail.

A-1-2. Aggregation Table

FIG. 3 shows the structure of the aggregation table 221. The aggregation table 221 includes several items 'entry number' 'aggregate flow identification condition', and 'statistical information'. The combination of the six identifiers VLAN ID (VIP), the source IP address (SIP), the destination IP address (DIP), the upper protocol (PRT), the source port number (SPT), and the destination port number (DPT) defines the aggregate flow recorded in the aggregation table 221. The combination of the identifiers may be set arbitrarily by the administrator.

The item 'entry number' represents an identification number used to unequivocally identify each entry in the aggregation table 221. The item 'aggregate flow identification condition' includes the six identifiers (VID, SIP, DIP, PRT, SPT, and DPT) mentioned above and miscellaneous. Various pieces of information included in the headers of packets, for example, the source MAC address, the destination MAC address, an input interface, and an output interface may be recorded as the 'miscellaneous'.

The item 'statistical information' includes 'packet number', 'byte number', 'start time', 'last update time', and 'miscellaneous'. The 'packet number' represents the number of packets belonging to a certain flow. The 'byte number' represents the cumulative number of bytes of packets belonging to a certain flow. The 'start time' represents the arrival time of a first packet belonging to a certain flow. The 'last update time' represents the arrival time of a last packet belonging to the certain flow. Various statistical values, for example, the number of SYN flagged-packets among TCP flagged-packets may be recorded as the 'miscellaneous'. In the description hereafter, the 'aggregate flow identification condition' and the 'statistical information' recorded in the aggregation table 221 are collectively called 'aggregate data'.

A-1-3. Statistical Flow Tables

FIGS. 4A through 4C show the structures of the statistical flow tables. The statistical flow tables 231, 232, and 233 shown in FIGS. 4A through 4C are provided for the respective statistical conditions defined by the combinations of at least one identifier. The statistical flow identification condition is set by a combination of identifiers arbitrarily selected by the administrator among the six identifiers of the aggregate flow identification condition explained above.

The SIP table 231 shown in FIG. 4A has the SIP as the statistical flow identification condition. The SIP-DIP table 232 shown in FIG. 4B has the combination of the SIP and DIP as the statistical flow identification condition. The SIP-DIP-DPT table 233 shown in FIG. 4C has the combination of the source IP address (SIP), the destination IP address (DIP), and the destination port number (DPT) as the statistical flow identification condition.

Each statistical flow table includes several items 'entry number', 'statistical flow identification condition', and 'statistical information'. The item 'entry number' represents an identification number used to unequivocally identify each entry in each statistical flow table. The item 'statistical flow identification condition' records the combination of identifiers included in the statistical flow identification condition of each statistical flow table. The SIP is recorded as the statistical flow identification condition in the SIP table 231. The SIP and DIP are recorded as the statistical flow identification condition in the SIP-DIP table 232. The SIP, the DIP, and the DPT are recorded as the statistical flow identification condition in the SIP-DIP-DPT table 233.

The item 'statistical information' includes 'packet number' and 'byte number' counted for each statistical flow, 'start time', 'last update time', and 'miscellaneous'. Various statistical values, for example, the number of SYN flagged-packets among TCP flagged-packets and the average value, the variance, the T-score, and the median value of the packet number calculated from the packet number of each statistical flow may be recorded as the 'miscellaneous'.

The 'variant number' is recorded as one piece of the statistical information in the respective statistical flow tables other than the SIP-DIP-DPT table 233. The 'variant number' represents the number of packets having an identical value for each identifier included in the statistical flow identification condition but different values for an identifier (variant identifier) other than the statistical flow identification condition. For example, in the SIP-DIP table 232, the 'variant number' represents the number of packets having identical values for SIP and DIP but different values for DPT. In the description hereafter, the 'statistical flow identification condition' and the 'statistical information' recorded in the respective statistical flow tables 231, 232, and 233 are collectively called 'statistical flow data'.

A-1-4. Structure of Aggregation Assembly

Figure 5:
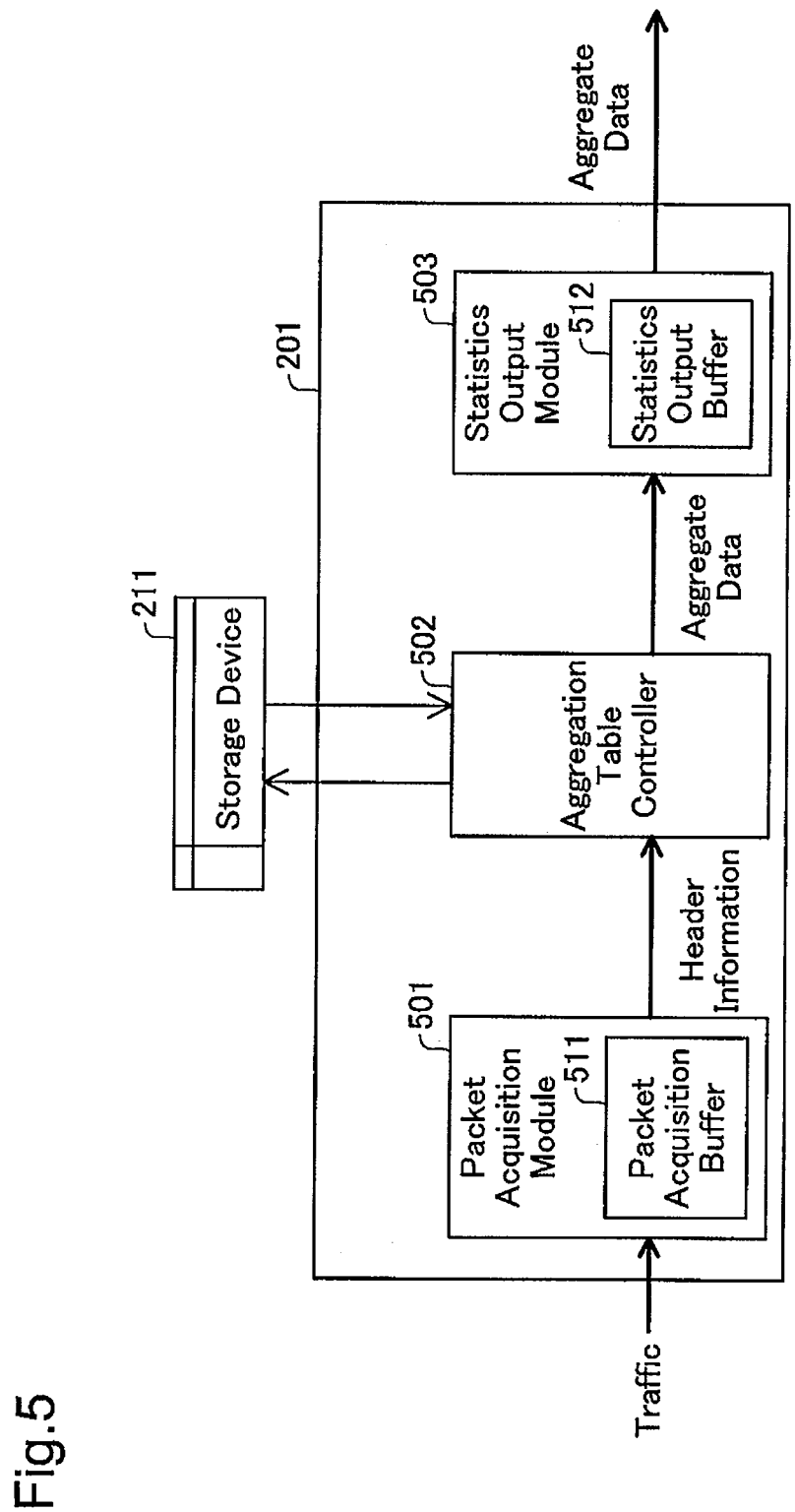
FIG. 5 is a functional block diagram showing the schematic structure of an aggregation assembly.

FIG. 5 is a functional block diagram showing the schematic structure of the aggregation assembly 201. As illustrated, the aggregation assembly 201 includes a packet acquisition module 501, an aggregation table controller 502, and a statistics output module 503. The packet acquisition module 501 has a packet acquisition buffer 511. The packet acquisition module 501 receives packets from the router 101a. Each packet includes identifiers VIP, SIP, DIP, PRT, SPT, and DPT, packet byte number information, and TCP flag information as header information.

The packet acquisition module 501 extracts the header information included in a received packet, adds the time of acquisition of the packet to the extracted header information, and accumulates the header information in the packet acquisition buffer 511. In the configuration of this embodiment, the packet acquisition module 501 is designed to receive a packet from the router 101a (in FIG. 1). In one modified configuration, the packet acquisition module 501 may be designed to capture a packet flowing through the network.

The header information extracted by the packet acquisition module 501 includes the identifiers VIP, SIP, DIP, PRT, SPT, and DPT used to identify each flow recorded in the aggregation table 221, the packet byte information, and the TCP flag information. The packet acquisition module 501 of the embodiment is equivalent to the 'receiver module' in the claims of the invention.

The aggregation table controller 502 obtains the header information accumulated in the packet acquisition buffer 511, classifies each received packet into a corresponding aggregate flow based on the identifiers VIP, SIP, DIP, PRT, SPT, and DPT included in the obtained header information, and sums up the packet number with regard to each classified aggregate flow. The aggregation table controller 502 then records the sum-up result in the aggregation table 221 (in FIG. 2) included in the storage device 211 (in FIG. 2) connected with the aggregation assembly 201.

According to a concrete procedure, the aggregation table controller 502 extracts the six identifiers VIP, SIP, DIP, PRT, SPT, and DPT from the header information accumulated in the packet acquisition buffer 511. The aggregation table controller 502 subsequently searches the aggregation table 221 to retrieve a specific entry having the identifiers of the aggregate flow identification condition in the aggregation table 221 that are identical with the extracted identifiers and extracts the aggregate data (including the aggregate flow identification condition and the statistical information) of the retrieved entry. The aggregation table controller 502 updates the corresponding statistical information included in the aggregation table 221, based on the extracted aggregate data of the retrieved entry and the header information obtained from the packet acquisition buffer 511.

The procedure of updating the statistical information is explained concretely. The aggregation table controller 502 counts up the 'packet number' by one in the statistical information of the aggregate data. The aggregation table controller 502 also adds the number of bytes included in the header information to the 'byte number' in the aggregate data and registers the time of acquisition of the packet as the 'last update time'. When an SYN flag is set in the obtained header information, the aggregation table controller 502 counts up the 'number of SYN flagged-packets' in the aggregate data by one.

The aggregation table controller 502 writes the updated aggregate data into the aggregation table 221. A memory management technique, such as an LRU (least recently used) algorithm or hash coding may be adopted to write the updated aggregate data into the aggregation table 221.

The aggregation table controller 502 searches the aggregation table 221 to retrieve a specific entry having the aggregate flow identification condition in the aggregation table 221 that is identical with the aggregate flow identification condition in the header information. When there is no entry having the identical aggregate flow identification condition, the aggregation table controller 502 creates a new entry. At this moment, the aggregation table controller 502 registers the time of acquisition of the packet as the 'start time' of the new entry.

The aggregation table controller 502 determines an entry number of each received packet in the aggregation table 221 that records the statistical information of the received packet, based on the identifiers extracted from the header information. A concrete procedure of determining the entry number calculates a hash value of the identifiers extracted from the header information by a hash function and maps the calculated hash value to one entry number. The 'hash function' gives a representative numeral value of each given data. The hash function always gives an identical representative value for identical data.

When the updated aggregate data satisfies a preset output condition, the aggregation table controller 502 outputs the updated aggregate data to the statistics output module 503 and deletes the corresponding entry from the aggregation table 221. In this embodiment, the output condition set in advance by the administrator is that aggregate data (entry) is to be output when the packet number reaches a predetermined threshold value. The output condition is, however, not restricted to this condition but may be set arbitrarily. Another example of the output condition is that aggregate data is to be output periodically in a numerical order of the entry number. Another example of the output condition is that aggregate data (entry) is to be output after elapse of a predetermined time period since the start time of a first packet in an aggregate flow. Another example of the output condition is that aggregate data is to be output on reception of a preset number of packets. Another example of the output condition is that aggregate data of a certain entry overwritten by the hash coding is to be output. A combination of some of these conditions may be set as the output condition.

The statistics output module 503 has a statistics output buffer 512. The statistics output module 503 receives aggregate data from the aggregation table controller 502 and accumulates the received aggregate data in the statistics output buffer 512. When the number of aggregate data accumulated in the statistics output buffer 512 reaches a preset value, the statistics output module 503 outputs all the accumulated aggregate data to the statistical processing assembly 202.

The packet acquisition module 501, the aggregation table controller 502, and the statistics output module 503 are constructed by FPGA (field programmable gate array). All the functions may be actualized by one integral FPGA or alternatively the respective functions may be actualized by individual FPGAs. ASIC (Application Specific Integrated Circuit) may be adopted, instead of FPGA.

A-1-5. Structure of Statistical Processing Assembly

Figure 6:
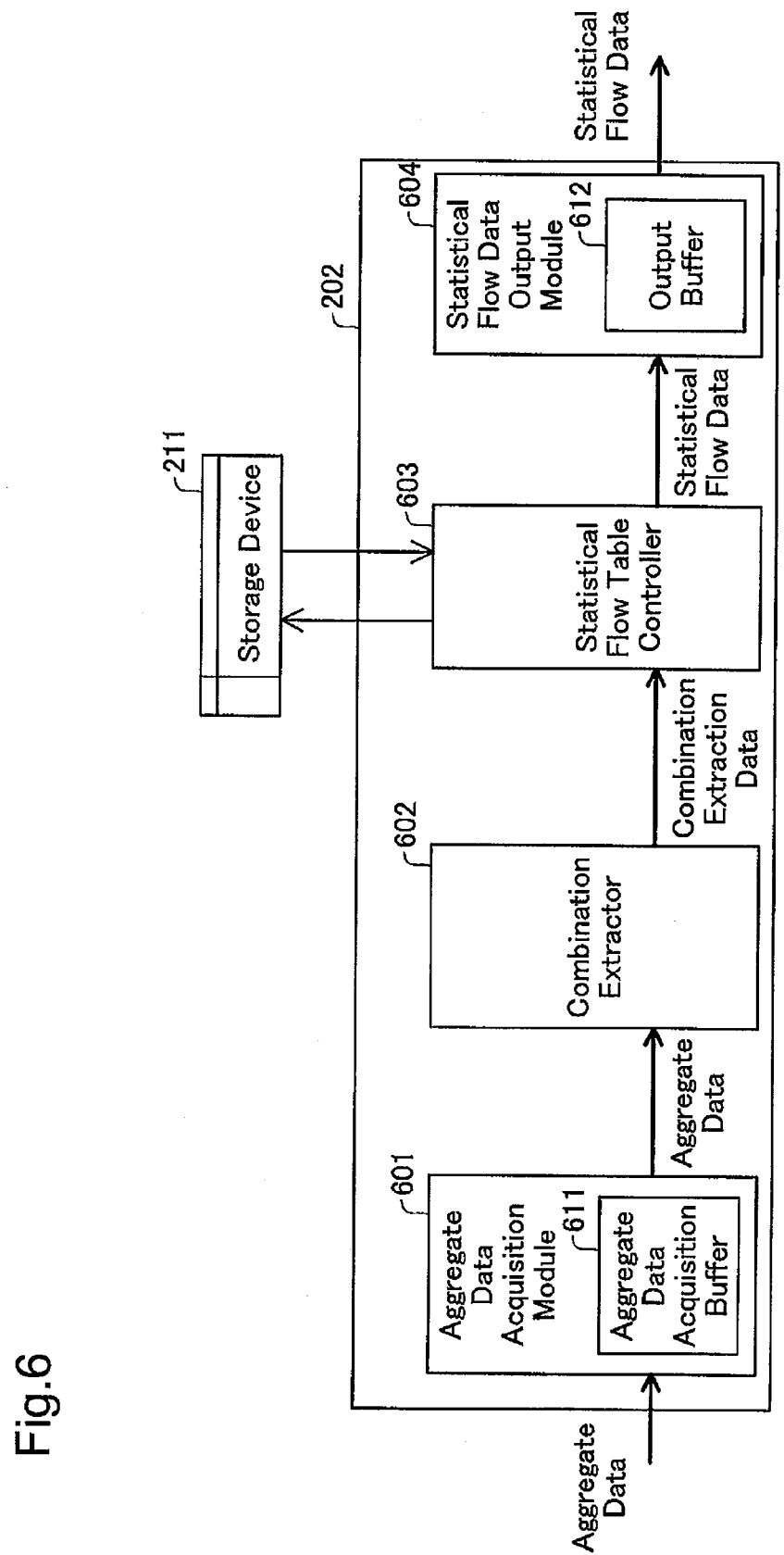
FIG. 6 is a functional block diagram showing the schematic structure of a statistical processing assembly.

FIG. 6 is a functional block diagram showing the schematic structure of the statistical processing assembly 202. As illustrated, the statistical processing assembly 202 includes an aggregate data acquisition module 601, a combination extractor 602, a statistical flow table controller 603, and a statistical flow data output module 604. The aggregate data acquisition module 601 has an aggregate data acquisition buffer 611. The aggregate data acquisition module 601 receives aggregate data from the aggregation assembly 201 and accumulates the received aggregate data into the aggregate data acquisition buffer 611.

The combination extractor 602 reads aggregate data from the aggregate data acquisition buffer 611 and extracts the identifiers to be recorded in each of the statistical flow tables 231, 232, and 233 (in FIGS. 4A through 4C) and the statistical information from the read aggregate data. FIG. 7 conceptually shows one combination of identifiers extracted by the combination extractor 602. As shown in FIG. 7, the combination extractor 602 extracts the identifier SIP and the statistical information with regard to one read aggregate data 701 for the processing of the SIP table 231. Similarly the combination extractor 602 extracts the identifiers SIP and DIP and the statistical information with regard to the read aggregate data 701 for the processing of the SIP-DIP table 232. The combination extractor 602 also extracts the identifiers SIP, DIP, and DPT and the statistical information with regard to the read aggregate data 701 for the processing of the SIP-DIP-DPT table 233. Unextracted identifiers are shown by hatching in FIG. 7. In the description hereafter, the extracted 'identifiers' and 'statistical information' are collectively called 'combination extraction data'. The combination extractor 602 sends extracted combination extraction data 702, 703, and 704 to the statistical flow table controller 603.

The statistical flow table controller 603 receives the combination extraction data from the combination extractor 602 and updates the respective statistical flow tables 231, 232, and 233 (in FIGS. 4A through 4C) based on the received combination extraction data.

The concrete procedure of updating the SIP-DIP-DPT table 233 is described below as an example. The statistical flow table controller 603 searches the SIP-DIP-DPT table 233 (in FIG. 4C) to retrieve a specific entry having the identifiers of the statistical flow identification condition in the SIP-DIP DPT table 233 that are identical with the identifiers SIP, DIP, and DPT included in the received combination extraction data and extracts the statistical flow data (statistical flow identification condition and statistical information) from the retrieved entry.

The statistical flow table controller 603 adds the 'packet number' of the statistical information included in the received combination extraction data to the 'packet number' of the statistical information included in the extracted statistical flow data. The statistical flow table controller 603 also adds the 'byte number' of the statistical information included in the received combination extraction data to the 'byte number' of the statistical information included in the extracted statistical flow data, and registers the 'last time' of the statistical information included in the received combination extraction data as the 'last update time' of the statistical information included in the extracted statistical flow data. The statistical flow table controller 603 adds the 'packet number' of the statistical information included in the received combination extraction data to the 'number of SYN flagged-packets' of the statistical information included in the extracted statistical flow data. The statistical flow table controller 603 then writes the updated statistical flow data into the SIP-DIP-DPT table 233 (in FIG. 4C). The memory management technique, such as the LRU algorithm or the hash coding may be adopted to write the updated statistical flow data into the SIP-DIP-DPT table 233 in the same manner as the procedure of writing the updated aggregate data into the aggregation table 221 discussed above.

When the SIP-DIP-DPT table 233 has no entry having the identifiers that are identical with the identifiers SIP, DIP, and DPT included in the received combination extraction data, the statistical flow table controller 603 creates a new entry. At this moment, the statistical flow table controller 603 registers the 'start time' included in the combination extraction data as the 'start time' of statistical information in the new entry. The entry number in the SIP-DIP-DPT table 233 is determined according to the hash function in the same manner as the entry number in the aggregation table 221 described previously.

When the updated statistical flow data satisfies a preset output condition, the statistical flow table controller 603 outputs the updated statistical flow data to the statistical flow data output module 604 and deletes the corresponding entry from the SIP-DIP-DPT table 233. The output condition is similar to the output condition used by the aggregation table controller 502 for outputting the aggregate data as discussed previously. The SIP table 231 and the SIP-DIP table 232 are updated in a similar manner.

The statistical flow data output module 604 has an output buffer 612 (in FIG. 6). The statistical flow data output module 604 receives the statistical flow data from the statistical flow table controller 603 and accumulates the received statistical flow data in the output buffer 612. When the number of statistical flow data accumulated in the output buffer 612 reaches a preset value, the statistical flow data output module 604 outputs all the accumulated statistical flow data to a database (not shown) provided in the communication data statistical apparatus 104.

The statistical flow data output module 604 may output the statistical flow data to a selected apparatus connected via the network and designed to collect flow data, for example, the server 102a equipped with a database. The apparatus designed to collect flow data may be connected via an interface, such as RS-232C or USB. The statistical flow data output module 604 may output the statistical information to a display device or a printing device connected with the communication data statistical apparatus 104, as well as to a predetermined interface.

The aggregate data acquisition module 601, the combination extractor 602, the statistical flow table controller 603, and the statistical flow data output module 604 are constructed by FPGA. All the functions may be actualized by one integral FPGA or alternatively the respective functions may be actualized by individual FPGAs. ASIC may be adopted, instead of FPGA.

A-2. Operations of First Embodiment

Figure 8:
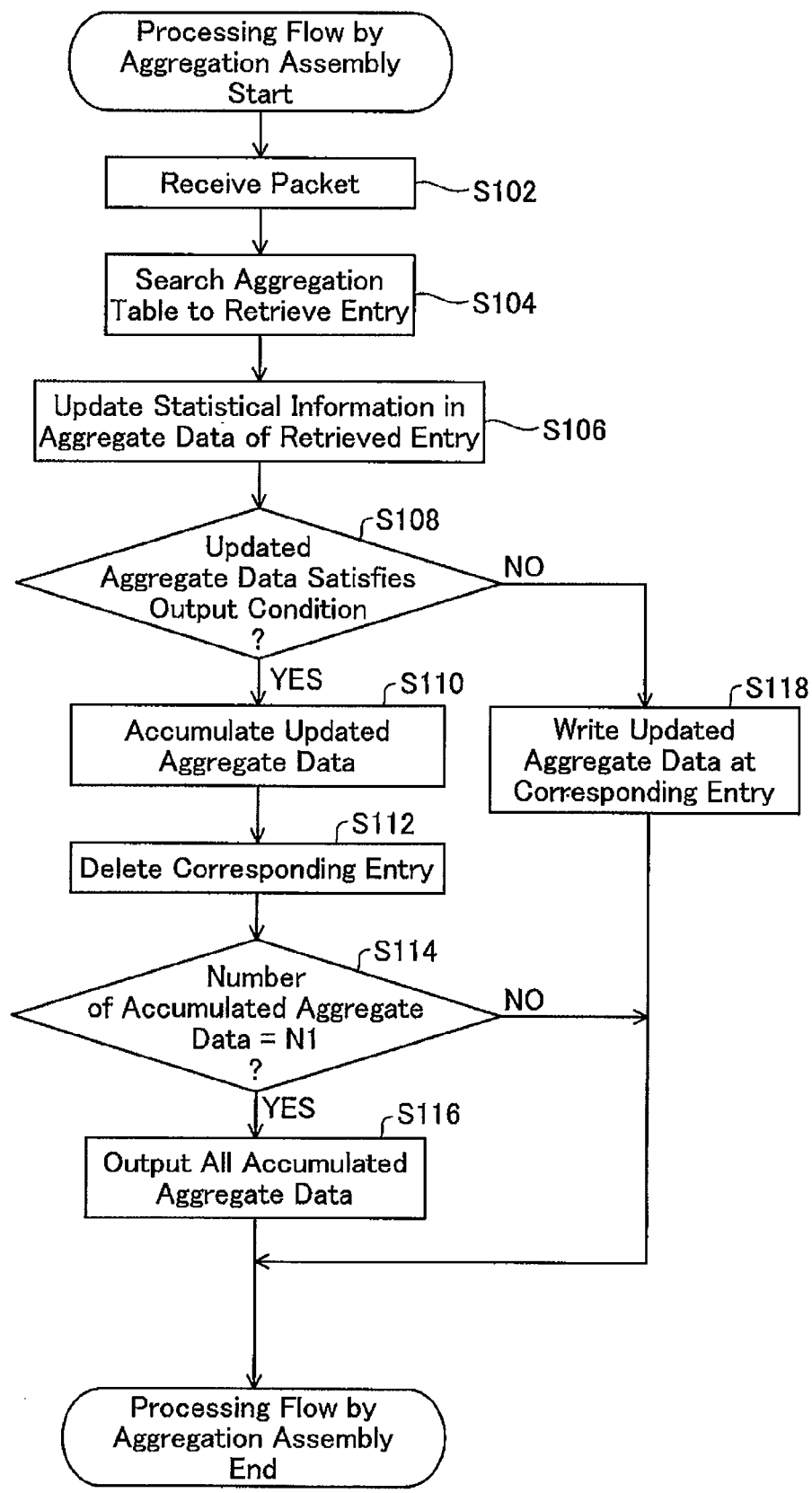
FIG. 8 is a flowchart showing a processing flow performed by the aggregation assembly in the first embodiment.
Figure 9:
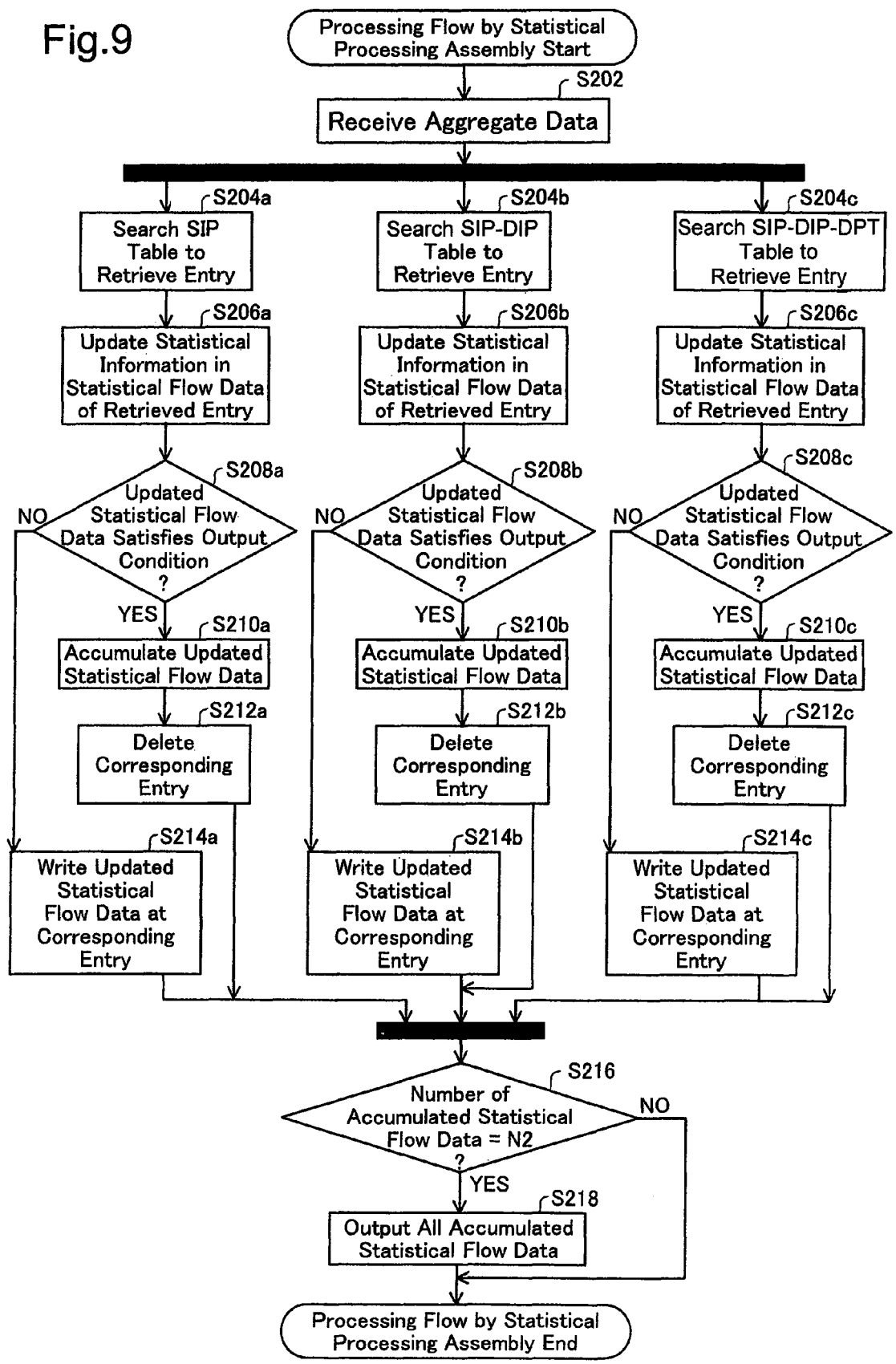
FIG. 9 is a flowchart showing a processing flow performed by the statistical processing assembly in the first embodiment.

The operations of the communication data statistical apparatus 104 of the first embodiment are described below with reference to FIGS. 8 and 9. FIG. 8 is a flowchart showing a processing flow performed by the aggregation assembly 201 in the first embodiment. FIG. 9 is a flowchart showing a processing flow performed by the statistical processing assembly 202 in the first embodiment.

With reference to the flowchart of FIG. 8, the aggregation assembly 201 receives a packet from the router 101a (step S102) and searches the aggregation table 221 (in FIG. 2) to retrieve a specific entry having the identifiers that are identical with the identifiers VIP, SIP, DIP, PRT, SPT, and DPT included in the received packet (step S104). The aggregation assembly 201 updates the statistical information included in the aggregate data of the retrieved entry based on the header information included in the received packet (step S106).

When the updated aggregate data satisfies the preset output condition (step S108: YES), the aggregation assembly 201 accumulates the updated aggregate data in the statistics output buffer 512 (in FIG. 5) (step S110) and deletes the entry corresponding to the aggregate data accumulated in the statistics output buffer 512 from the aggregation table 221 (step S112). When the number of aggregate data accumulated in the statistics output buffer 512 reaches a preset number N1 (step S114: YES), the aggregation assembly 201 outputs all the accumulated aggregate data to the statistical processing assembly 202 (step S116) and terminates this processing flow.

When the updated aggregate data does not satisfy the preset output condition (step S108: NO), on the other hand, the aggregation assembly 201 writes the updated aggregate data at the corresponding entry in the aggregation table 221 (step S118) and terminates the processing flow.

When the number of aggregate data accumulated in the statistics output buffer 512 does not reach the preset number N1 (step S114: NO), the aggregation assembly 201 does not output the aggregate data but terminates the processing flow. The aggregation assembly 201 performs this series of processing steps on reception of a packet. Namely, on the occasion of reception of successive packets, the aggregation assembly 201 repeats the above series of processing steps to successively update the aggregation table 221 stored in the storage device 211 (in FIG. 2).

With reference to the flowchart of FIG. 9, the statistical processing assembly 202 receives aggregate data from the aggregation assembly 201 (step S202) and extracts the identifiers to be registered in each statistical flow table and the statistical information from the received aggregate data as discussed above. The statistical processing assembly 202 searches the SIP table 231 to retrieve a specific entry having the identifier that is identical with the extracted identifier SIP (step S204a) and updates the statistical information included in the statistical flow data of the retrieved entry based on the extracted statistical information (step S206a).

When the updated statistical flow data satisfies the preset output condition (step S208a: YES), the statistical processing assembly 202 accumulates the updated statistical flow data in the output buffer 612 (in FIG. 6) (step S210a) and deletes the entry corresponding to the accumulated statistical flow data from the SIP table 231 (step S212a).

When the updated statistical flow data does not satisfy the preset output condition (step S208a: NO), on the other hand, the statistical processing assembly 202 writes the updated statistical flow data at the corresponding entry in the SIP table 231 (step S214a).

The statistical processing assembly 202 performs the similar series of processing with regard to the SIP-DIP table 232 and the SIP-DIP-DPT table 233 (steps S204b through S214b and steps S204c through 5214c).

On completion of the update of the statistical flow data based on one received aggregate data with regard to all the three statistical flow tables, the SIP table 231, the SIP-DIP table 232, and the SIP-DIP-DPT table 233, the statistical processing assembly 202 determines whether the number of statistical flow data accumulated in the output buffer 612 (in FIG. 6) reaches a preset number N2 (step S216). When the number of accumulated statistical flow data reaches the preset number N2 (step S216: YES), the statistical processing assembly 202 outputs all the accumulated statistical flow data to a database (not shown) provided in the communication data statistical apparatus 104 (step S218) and terminates the processing flow.

When the number of statistical flow data accumulated in the output buffer 612 does not reach the preset number N2 (step S216: NO), the statistical processing assembly 202 does not output the statistical flow data but terminates the processing flow. The statistical processing assembly 202 performs this series of processing steps on reception of aggregate data. Namely on the occasion of reception of successive aggregate data, the statistical processing assembly 202 repeats the above series of processing steps to successively update the SIP table 231, the SIP-DIP table 232, and the SIP-DIP-DPT table 233 stored in the storage device 211 (in FIG. 2).

A-3. Effects of First Embodiment

The communication data statistical apparatus of the prior art configuration creates a flow table for each combination of identifiers corresponding to one of the multiple statistical conditions with regard to communication data (traffic) flowing through a network. On reception of each packet, the prior art communication data statistical apparatus updates the statistical information in all the flow tables. More specifically, the prior art communication data statistical apparatus makes access to a memory storing the flow tables to update the statistical information, in response to reception of each packet. When the number of received packets is n packets and there are three flow tables (SIP table, SIP-DIP table, and SIP-DIP-DPT table) as the objects of updating the statistical information, it is required to update the statistical information (n×3 (the number of statistical flow tables)) times. In a high line speed condition, enormous numbers of packets are received. The restricted access rate to the memory storing the flow tables may cause difficulty in recording the required statistical information into the memory.

The communication data statistical apparatus 104 of this embodiment sums up the packet number in each aggregate flow defined by all the identifiers including SIP, DIP, and DPT, before updating the statistical information in the SIP table 231, the SIP-DIP table 232, and the SIP-DIP-DPT table 233. The statistical information in the SIP table 231, the SIP-DIP table 232, and the SIP-DIP-DPT table 233 is updated, based on the aggregate data representing the sum-up result.

It is here assumed that the number of packets received by the aggregation assembly 201 is n packets and that the number of packets sent from the aggregation assembly 201 to the statistical processing assembly 202 is m packets (m<n). On this assumption, the frequency of updating the statistical information in the SIP table 231, the SIP-DIP table 232, and the SIP-DIP-DPT table 233 by the statistical processing assembly 202 is equal to (m×3 (the number of statistical flow tables)). The total table updating frequency in the communication data statistical apparatus 104 of this embodiment is accordingly (n+3m) as the sum of the frequency of updating the aggregation table 221 and the frequency of updating the three statistical flow tables 231, 232, and 233.

When the aggregate flow typically includes 10 packets, the aggregation rate (output packet number m/input packet number n)=1/10. This leads to the relation n+3 m<3n. The communication data statistical apparatus 104 of this embodiment desirably decreases the table updating frequency and reduces the number of accesses to the storage device 211, compared with the prior art communication data statistical apparatus. This arrangement ensures the high-speed statistics and thus allows statistics of communication data to be taken even in a large-scaled network or in a high line speed condition.

In the communication data statistical apparatus 104 of the embodiment, when the updated aggregate data satisfies the preset output condition, the aggregation table controller 502 of the aggregation assembly 201 outputs the updated aggregate data to the statistics output module 503 and deletes the corresponding entry from the aggregation table 221. When the updated statistical flow data satisfies the preset output condition, the statistical flow table controller 603 of the statistical processing assembly 202 outputs the updated statistical flow data to the statistical flow data output module 604 and deletes the corresponding entry from the relevant statistical flow table 231, 232, or 233. Upon satisfaction of the preset output condition in the course of update of the statistical information, the communication data statistical apparatus 104 of the embodiment deletes the corresponding entry from the relevant table stored in the storage device 211 to increase the free space in the storage device 211. In statistics of a number of conditions, even a storage device 211 having a relatively small memory capacity is sufficient to update the statistical flow tables with classification and aggregation of packets.

Upon satisfaction of the preset output condition, the communication data statistical apparatus 104 of the embodiment deletes the corresponding entry from the relevant table stored in the storage device 211. Such deletion of the entries decreases the potential for accumulation of enormous aggregate data or statistical flow data in the storage device 211. This arrangement effectively shortens the time required for retrieval of an object entry on the occasion of updating the aggregation table 221 or in the statistical flow tables 231, 232, and 233.

The communication data statistical apparatus 104 of the embodiment outputs multiple pieces of statistical information with regard to each received packet to an external device. The carrier or ISP utilizes the output statistical information to check the status of data transfer quality in provided service. The output statistical information is also utilized for traffic engineering that ensures effective use of network resources. The output statistical information is further utilized for provisioning that systematically prepares network resources with prediction of users' demands and immediately provides a required network resource in response to each user's demand, for example band or service, as well as for detection and analysis of attacks and relevant charging.

The communication data statistical apparatus 104 of the embodiment also outputs the sum-up result of the variant number. The sum-up result indicates the variance of the flow classified by the flow identification condition with regard to other identifiers. This arrangement monitors proliferation of network worms based on port scans.

B. Second Embodiment

Figure 10:
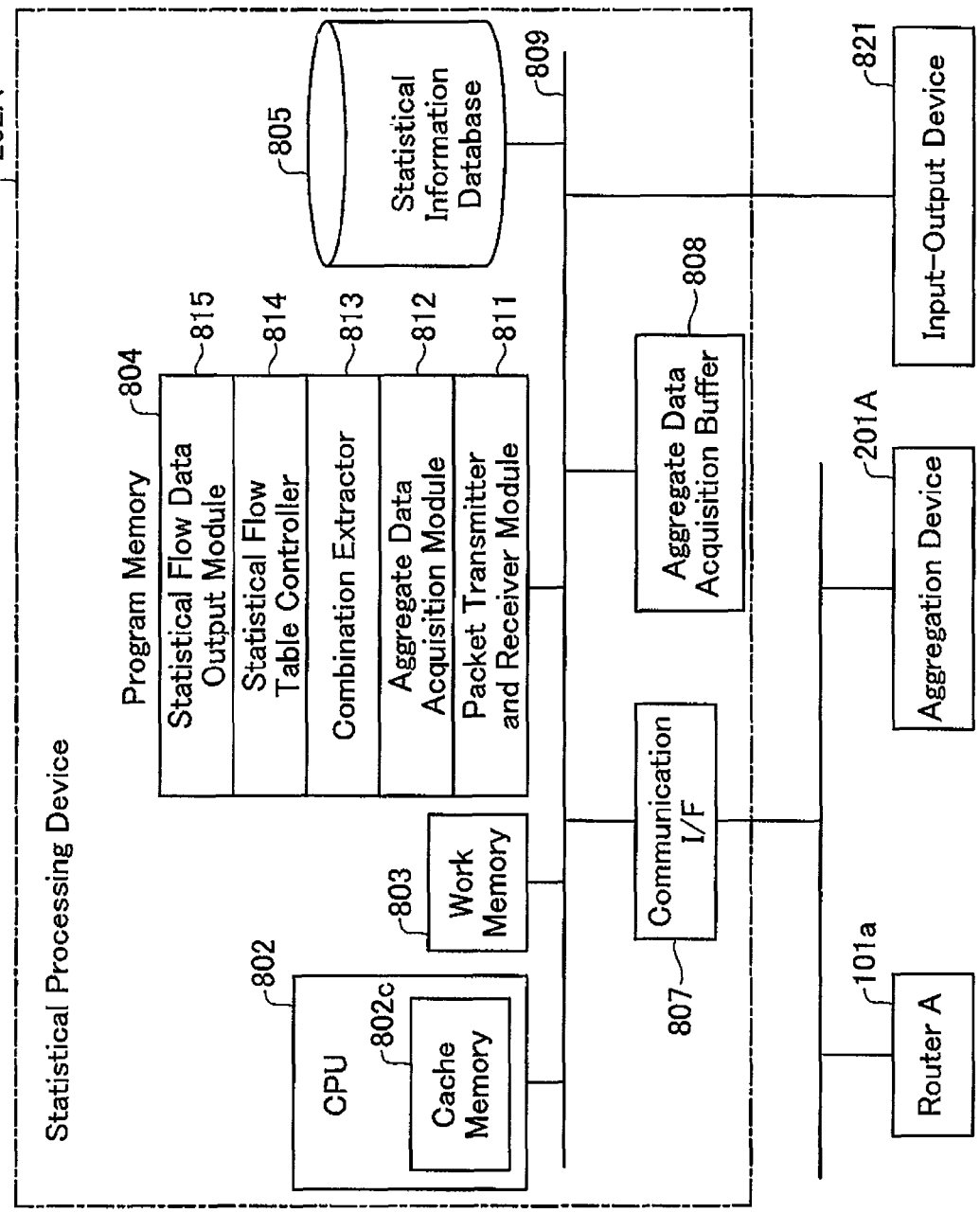
FIG. 10 is a block diagram schematically illustrating the structure of a statistical processing device in a second embodiment of the invention.

Another implementation of a communication data statistical apparatus is discussed below as a second embodiment of the invention. In the second embodiment, the aggregation assembly 201 of the first embodiment is implemented as an aggregation device 201A of hardware configuration, and the statistical processing assembly 202 of the first embodiment is implemented as a statistical processing device 202A of software configuration including a computer and programs. The aggregation device 201A and the statistical processing device 202A may be interconnected via a communication interface or may be directly interconnected with a bus. FIG. 10 is a block diagram schematically illustrating the structure of the statistical processing device 202A.

As shown in FIG. 10, the statistical processing device 202A includes a CPU (central processing unit) 802, a work memory 803, a program memory 804, a statistical information database 805, a communication interface 807, an aggregate data acquisition buffer 808, and an input-output device 821, which are interconnected by a bus 809.

The program memory 804 stores a packet transmitter and receiver module 811, an aggregate data acquisition module 812, a combination extractor 813, a statistical flow table controller 814, and a statistical flow data output module 815. These modules are constructed by programs executed to actualize the corresponding functions discussed above in the first embodiment. The CPU 802 loads the programs stored in the program memory 804 to the work memory 803 and executes the programs to attain the respective functions.

The statistical information database 805 stores the three statistical flow tables, the SIP table 231, the SIP-DIP table 232, and the SIP-DIP-DPT table 233 described in the first embodiment. The statistical flow data to be output is also recorded in the statistical information database 805. The aggregate data acquisition buffer 808 stores the aggregate data input from the aggregation device 201a via the communication interface 807.

Figure 11:
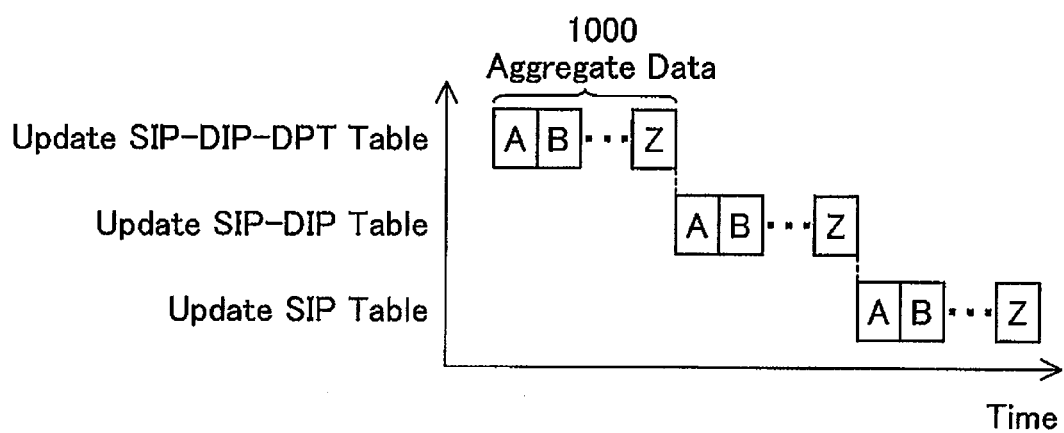
FIG. 11 is an explanatory view conceptually showing an updating sequence of statistical flow tables in the second embodiment.

FIG. 11 conceptually shows an updating sequence of the statistical flow tables in the embodiment. Symbols A through Z in FIG. 11 show aggregate data used for updating the respective statistical flow tables 231, 232, and 233. In the second embodiment, the combination extractor 813 first extracts combination extraction data, which is to be stored in the SIP-DIP-DPT table 233, from first aggregate data ('A' in FIG. 11) among the aggregate data accumulated in the aggregate data acquisition buffer 808, and sends the extracted combination extraction data to the statistical flow table controller 814. The combination extractor 813 subsequently extracts combination extraction data, which is to be stored in the SIP-DIP-DPT table 233, from second aggregate data ('B' in FIG. 11) and sends the extracted combination extraction data to the statistical flow table controller 814.

In this manner, the combination extractor 813 of this embodiment first extracts combination extraction data, which is to be stored in the SIP-DIP-DPT table 233, with regard to 1000 aggregate data accumulated in the aggregate data acquisition buffer 808 and sends the extracted combination extraction data to the statistical flow table controller 814. The combination extractor 813 subsequently extracts combination extraction data, which is to be stored in the SIP-DIP table 232, with regard to the same 1000 aggregate data used for extraction of the combination extraction data to be stored in the SIP-DIP-DPT table 233 and sends the extracted combination extraction data to the statistical flow table controller 814. The combination extractor 813 then extracts combination extraction data, which is to be stored in the SIP table 231, with regard to the same 1000 aggregate data used for extraction of the combination extraction data to be stored in the SIP-DIP-DPT table 233 and sends the extracted combination extraction data to the statistical flow table controller 814. In this embodiment, the combination extraction data to be stored in each statistical flow table is extracted with regard to the identical 1000 aggregate data. The number of the aggregate data is, however, not restricted to 1000, but may be arbitrarily set in advance by the administrator, for example, 10000 aggregate data or 100000 aggregate data.

The statistical flow table controller 814 updates the respective statistical flow tables 231, 232, and 233, based on the received combination extraction data. According to a concrete procedure, the statistical flow table controller 814 first updates 1000 statistical flow data included in the SIP-DIP-DPT table 233, then updates 1000 statistical flow data included in the SIP-DIP table 232, and lastly updates 1000 statistical flow data included in the SIP table 231. Namely the CPU 802 continuously updates each identical statistical flow table. While the CPU 802 updates one identical statistical flow table, a cache memory 802c attached to the CPU 802 is occupied by the statistical flow table. This leads to the enhanced cache hit rate. The terminology 'continuously update each identical statistical flow table' does not exclude insertion of any processing other than the updating process of the statistical flow tables as long as the updating process of one identical statistical flow table is continuously performed. The updating process of the SIP-DIP table 232 or the updating process of the SIP table 231 should not be inserted during the updating process of the SIP-DIP-DPT table 233 with regard to 1000 aggregate data.

The operations of the statistical processing device 202A of this embodiment are described below with reference to FIGS.

Figure 12:
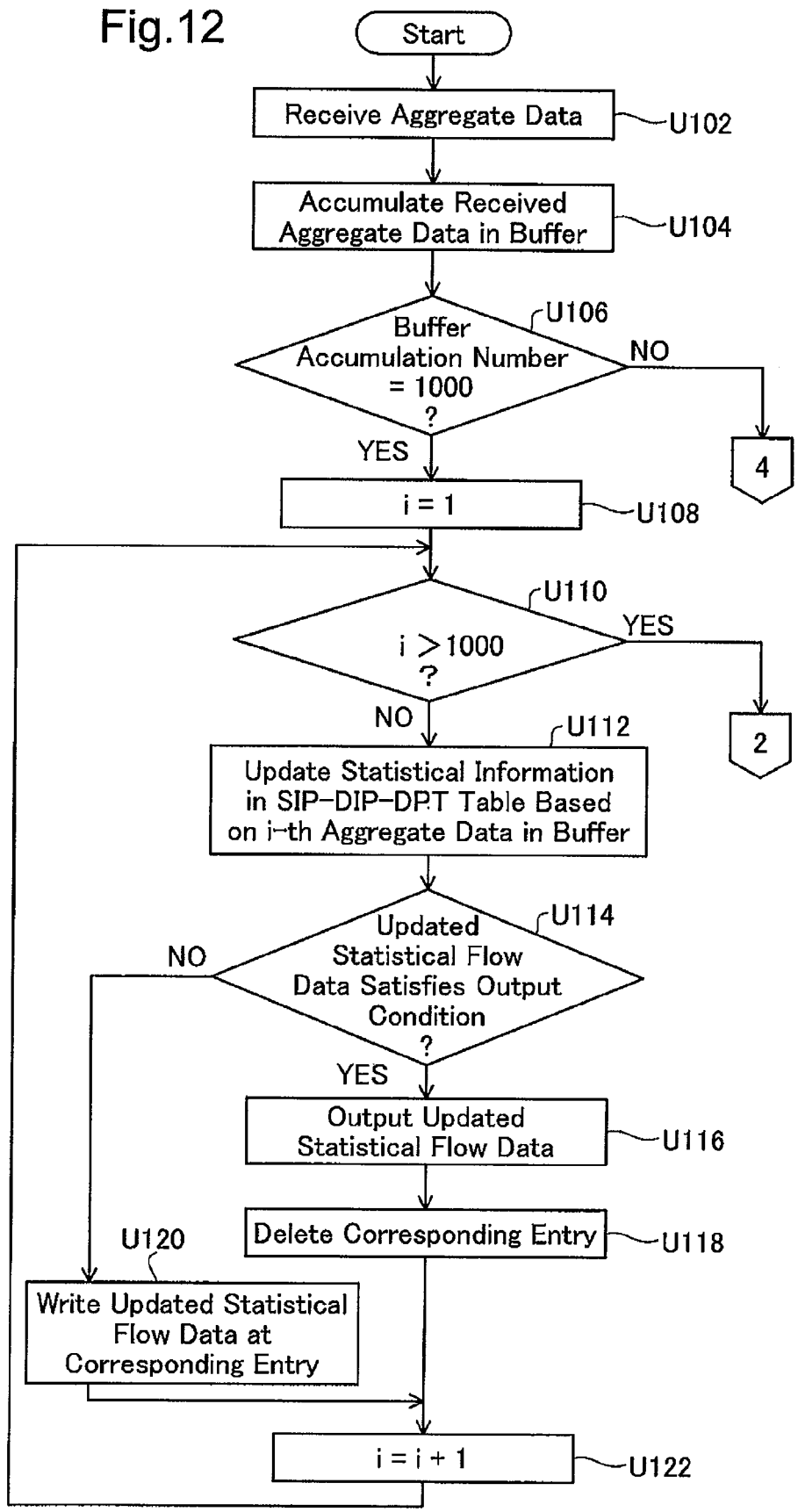
FIG. 12 is a flowchart showing a processing flow performed in the statistical processing device.
Figure 13:
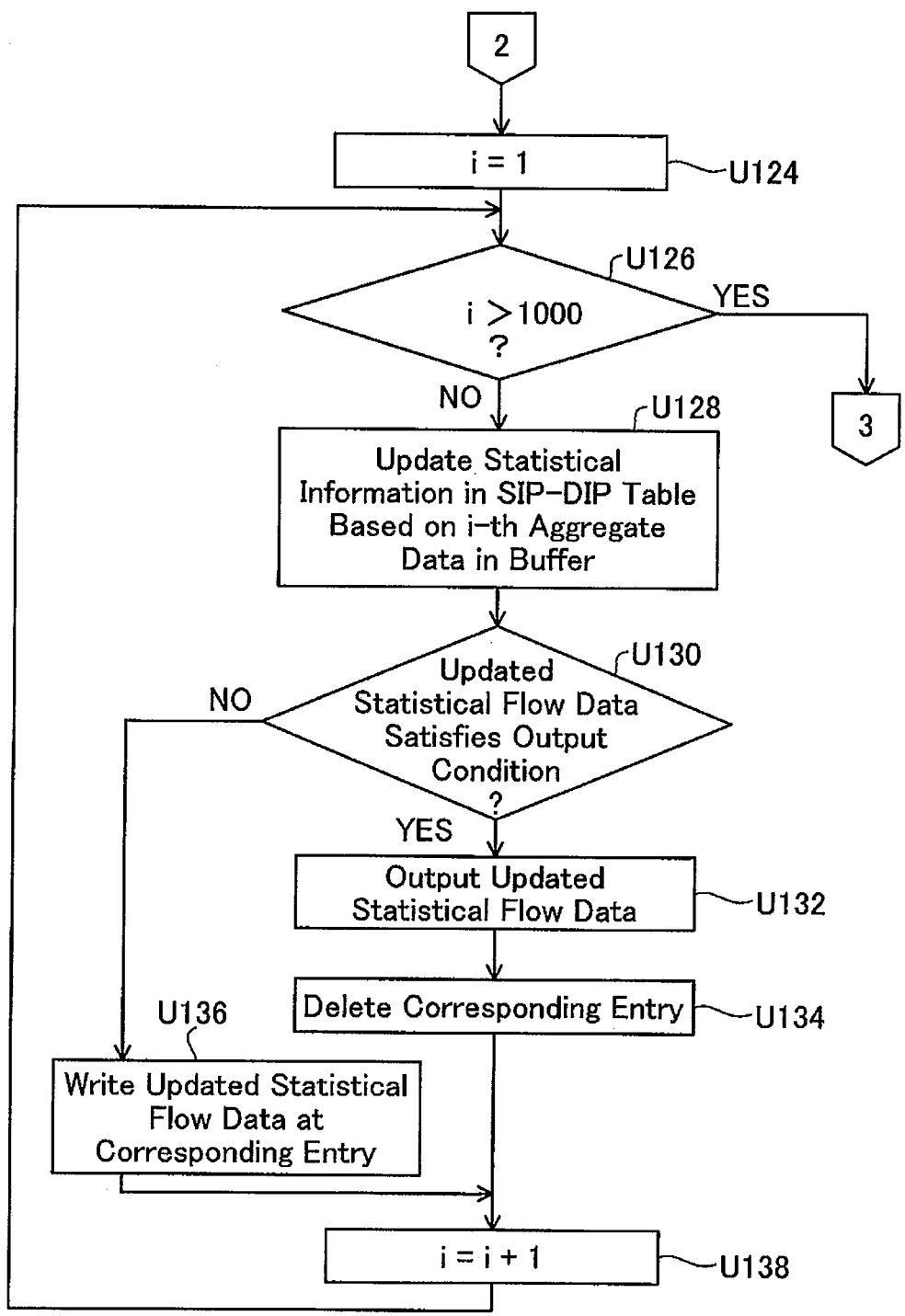
FIG. 13 is a flowchart showing the processing flow performed in the statistical processing device.
Figure 14:
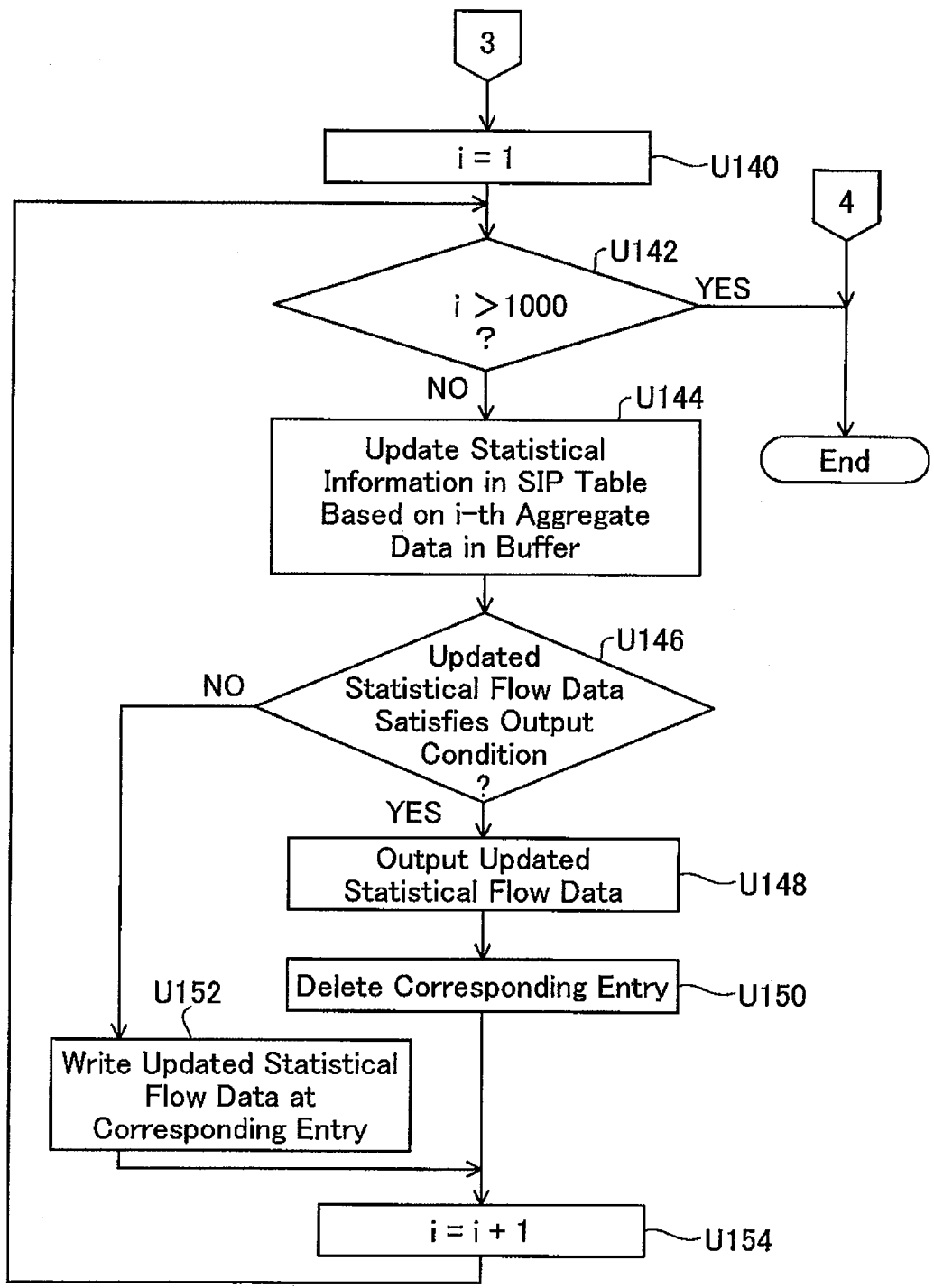
FIG. 14 is a flowchart showing the processing flow performed in the statistical processing device.

12 through 14. FIGS. 12 through 14 are flowcharts showing a processing flow performed by the statistical processing device 202A.

With reference to the flowchart of FIG. 12, the aggregate data acquisition module 812 receives aggregate data (step U102), accumulates the received aggregate data in the aggregate data acquisition buffer 808 (step U104), and determines whether the number of aggregate data accumulated in the aggregate data acquisition buffer 808 (hereafter referred to as 'buffer accumulation number') reaches 1000 (step U106). When the buffer accumulation number is equal to 1000 (step U106: YES), the combination extractor 813 sets 'i' equal to 1 (step U108).

Since 'i'<1000 (step U110: NO), the combination extractor 813 extracts combination extraction data, which is to be stored in the SIP-DIP-DPT table 233, from $1^{st}$ aggregate data among the aggregate data accumulated in the aggregate data acquisition buffer 808 and sends the extracted combination extraction data to the statistical flow table controller 814. The statistical flow table controller 814 searches the SIP-DIP-DPT table 233 to retrieve a specific entry having the identical identifiers based on the received combination extraction data and updates the statistical information included in the statistical flow data of the retrieved entry (step U112).

When the updated statistical flow data satisfies a preset output condition (step U114: YES), the statistical flow table controller 814 outputs the updated statistical flow data to the statistical flow data output module 815 (step U116) and deletes the corresponding entry from the SIP-DIP-DPT table 233 (step U118). The output condition is similar to that applied in the first embodiment discussed previously. When the updated statistical flow data does not satisfy the preset output condition (step U114: NO), on the other hand, the statistical flow table controller 814 writes the updated statistical flow data at the corresponding entry in the SIP-DIP-DPT table 233 (step U120).

The combination extractor 813 then counts up 'i' by one (i=2) (step U122) and goes back to step U110 and subsequent steps to update the statistical information in the SIP-DIP-DPT table 233 based on $2^{nd}$ aggregate data among the aggregate data accumulated in the aggregate data acquisition buffer 808. The CPU 802 repeats the processing of steps U110 through U122. After updating the statistical information in the SIP-DIP-DPT table 233 based on $1000^{th}$ aggregate data among the aggregate data accumulated in the aggregate data acquisition buffer 808, the CPU 802 counts up 'i' by one to 'i'=1001 at step U122 and goes back to step U110. Since 'i'>1000 (step U110: YES), the processing flow proceeds to step U124 in the flowchart of FIG. 13.

With reference to the flowchart of FIG. 13, the combination extractor 813 sets 'i' equal to 1 (step U124). Since 'i'<1000 (step U126: NO), the combination extractor 813 extracts combination extraction data, which is to be stored in the SIP-DIP table 232, from $1^{st}$ aggregate data among the aggregate data accumulated in the aggregate data acquisition buffer 808 and sends the extracted combination extraction data to the statistical flow table controller 814. The statistical flow table controller 814 searches the SIP-DIP table 232 to retrieve a specific entry having the identical identifiers based on the received combination extraction data and updates the statistical information included in the statistical flow data of the retrieved entry (step U128).

When the updated statistical flow data satisfies a preset output condition (step U130: YES), the statistical flow table controller 814 outputs the updated statistical flow data to the statistical flow data output module 815 (step U132) and deletes the corresponding entry from the SIP-DIP table 232 (step U134). The output condition is similar to that applied for the SIP-DIP-DPT table 233 discussed previously. When the updated statistical flow data does not satisfy the preset output condition (step U130: NO), on the other hand, the statistical flow table controller 814 writes the updated statistical flow data at the corresponding entry in the SIP-DIP table 232 (step U136).

As in the case of updating the SIP-DIP-DPT table 233 discussed above, in the case of updating the SIP-DIP table 232, the CPU 802 counts up 'i' by one (step U138) and repeats the processing of steps U126 through U136 until 'i' is equal to 1000. When 'i'=1001 (step U126: YES), the processing flow proceeds to step U140 to set 'i' equal to 1 in the flowchart of FIG. 14.

As in the case of updating the SIP-DIP-DPT table 233 and the SIP-DIP table 232 discussed above, the CPU 802 repeats the processing of steps U142 through U152 to update the statistical information in the SIP table based on $1^{st}$ through $1000^{th}$ aggregate data accumulated in the aggregate data acquisition buffer 808. The CPU 802 terminates the processing flow when 'i'=1001. When the buffer accumulation number is less than 1000 (step U106: NO), the CPU 802 immediately terminates the processing flow without performing the processing of steps U108 through U154. Namely the CPU 802 does not perform the processing of steps U108 through U154 but simply accumulates the received aggregate data into the aggregate data acquisition buffer 808 until the buffer accumulation number reaches 1000. When the buffer accumulation number reaches 1000, the CPU 802 repeats the processing of steps U108 through U154 to update the SIP-DIP-DPT table 233, the SIP-DIP table 232, and the SIP table 231.

The operations of the aggregation device 201A of the second embodiment are similar to those of the aggregation assembly 201 of the first embodiment and are thus not specifically explained here.

In the statistical processing device 202A of the communication data statistical apparatus of the second embodiment described above, the CPU 802 continuously updates each identical statistical flow table. While the CPU 802 updates one identical statistical flow table, the cache memory 802c attached to the CPU 802 is occupied by the statistical flow table. This leads to the enhanced cache hit rate. This arrangement desirably reduces the frequency of accesses of the CPU 802 to the statistical information database 805 storing the respective statistical flow tables, thus enhancing the speed of statistics, compared with the conventional technique of updating the three statistical flow tables (the SIP-DIP-DPT table 233, the SIP-DIP table 232, and the SIP table 231) based on one aggregate data and repeating this updating process with regard to 1000 aggregate data.

C. Third Embodiment

Another implementation is discussed below as a third embodiment of the invention. The communication data statistical apparatus 104 of the first embodiment and the communication data statistical apparatus of the second embodiment discussed above are constructed as standalone devices. In the third embodiment, on the other hand, the functions of the communication data statistical apparatus 104 discussed above (hereafter referred to as 'communication data statistical functions') are implemented inside the router 101a shown in FIG. 1.

Figure 15:
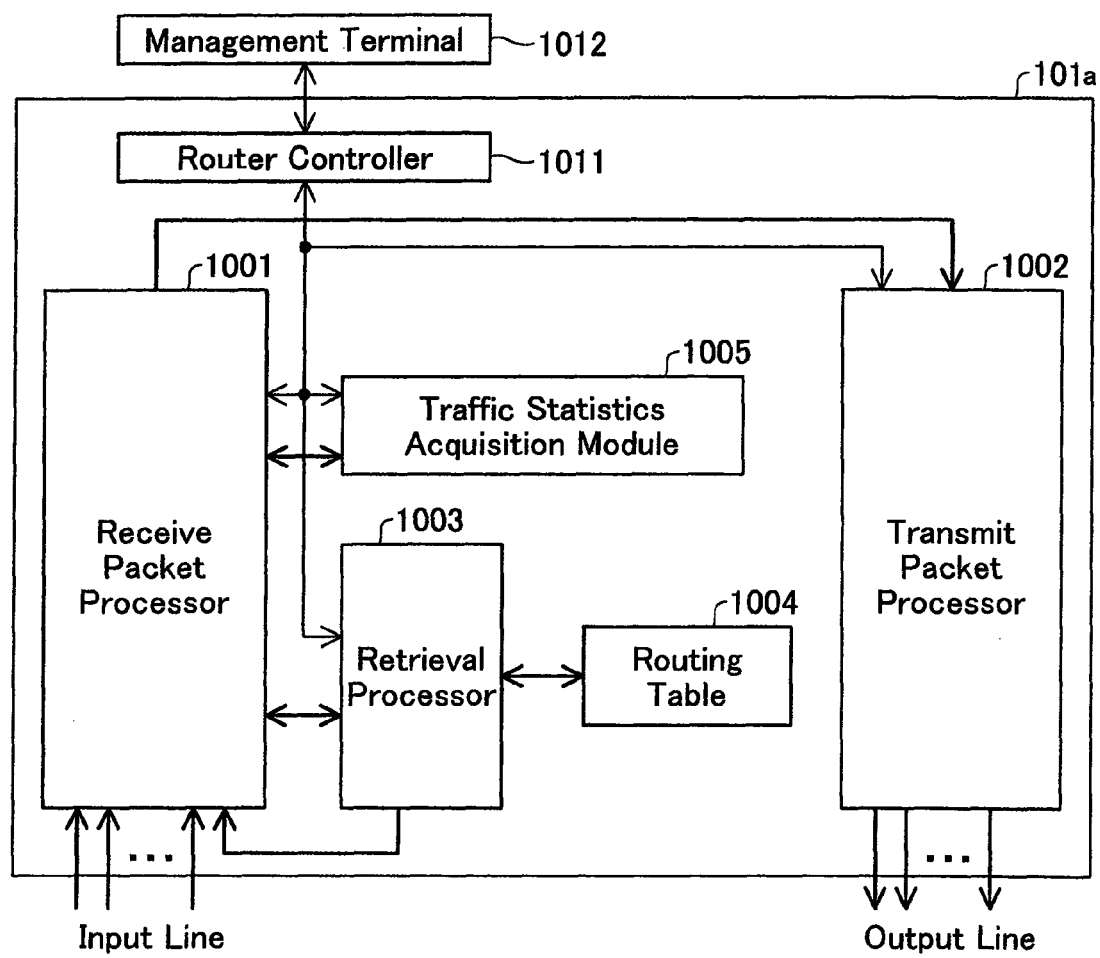
FIG. 15 is a functional block diagram schematically illustrating the structure of a router with built-in communication data statistical functions.

FIG. 15 is a functional block diagram schematically illustrating the structure of the router 101a with the built-in communication data statistical functions. The router 101a includes a receive packet processor 1001 connected with an input line, a transmit packet processor 1002 connected with an output line, a retrieval processor 1003 connected with the receive packet processor 1001, a traffic statistics acquisition module 1005, a routing table 1004 attached to the retrieval processor 1003, and a router controller 1011.

The router controller 1011 is connected with a management terminal 1012 to perform various settings in the receive packet processor 1001, the transmit packet processor 1002, and the retrieval processor 1003 in response to an instruction given by the management terminal 1012. The management terminal 1012 and the router controller 1011 may be interconnected via a network or may be interconnected by an interface, such as RS-232C or USB.

The receive packet processor 1001 temporarily accumulates packets received via the input line into an internal buffer (not shown) and sends header information of the accumulated packets to the retrieval processor 1003 and the traffic statistics acquisition module 1005.

The retrieval processor 1003 receives the header information of the accumulated packets from the receive packet processor 1001, refers to the routing table 1004 to retrieve the output line as the destination of the accumulated packets, and notifies the receive packet processor 1001 of the retrieval result.

The receive packet processor 1001 receives the retrieval result from the retrieval processor 1003 and transfers the packets accumulated in the buffer and the retrieval result to the transmit packet processor 1002 connected with the output line specified by the retrieval result.

The transmit packet processor 1002 receives the packets and the retrieval result of the retrieval processor 1003 from the receive packet processor 1001 and outputs the packets to the output line specified by the retrieval result.

The traffic statistics acquisition module 1005 has the functional blocks included in the communication data statistical apparatus 104 shown in FIG. 2. In the system of the first embodiment, the communication data statistical apparatus 104 receives traffic information from the router 101*a*. In the system of the third embodiment, on the other hand, the traffic statistics acquisition module 1005 receives the header information of the accumulated packets from the receive packet processor 1001. In the system of the first embodiment, the statistical flow data is output to the database or to the predetermined interface. In the system of the third embodiment, on the other hand, the statistical flow data is output to the receive packet processor 1001. The receive packet processor 1001 receives the statistical flow data and transfers statistical information in the received statistical flow data to selected network devices (for example, the terminal devices 103*a* through 103*c*).

In the third embodiment discussed above, the router 101*a* is allowed to take statistics of communication data in high speed lines.

D. Modification

The communication data statistical apparatus may be implemented by only the statistical processing device 202A of the second embodiment. In this modified example, the aggregate data acquisition module 812 in the statistical processing device 202A is replaced with the packet acquisition module 501 in the aggregation device 201A. The statistical processing device 202A accumulates packets received from the router 101*a* and updates the respective statistical flow tables (the SIP-DIP-DPT table 233, the SIP-DIP table 232, and the SIP table 231) based on the accumulated packets. In this application, the CPU 802 continuously updates each identical statistical flow table. This leads to the enhanced cache hit rate. This arrangement also effectively increases the speed of statistics, compared with the conventional procedure of updating all the statistical flow tables in response to reception of each packet. This modified structure is especially advantageous for lines with less traffic.

The embodiments, their applications, and their modification discussed above are to be considered in all aspects as illustrative and not restrictive in any sense. The present invention may be embodied in other specific forms with modifications, changes, and alterations without departing from the scope or spirit of the main characteristics of the present invention. For example, part or all of the functions of the hardware configuration may be actualized by the software configuration in the form of execution of preset programs by the CPU.

What is claimed is:

1. An apparatus configured to take statistics of multiple different statistical conditions for communication data flowing through a network, the apparatus comprising:
   a receiver module configured to receive packets including multiple different identifiers;
   an aggregation module configured to classify each packet, which is received by the receiver module and has corresponding identifiers identical with at least two preset different identifiers selected from the multiple different identifiers, into a certain aggregate flow, generate and accumulate aggregate statistical information including a number of packets belonging to the certain aggregate flow, and output the accumulated aggregate statistical information when the accumulated aggregate statistical information satisfies a preset output condition; and
   a statistical processing module configured to receive the aggregate statistical information output from the aggregation module,
   and perform an updating process arranged to update, in response to each receipt of the aggregate statistical information, multiple statistical flow tables corresponding to different statistical conditions defined by both a combination of a single identifier and a combination of identifiers that are part of the identifiers included in the aggregation flow, the combination of identifiers including at least two identifiers among an identifier of a source IP address, an identifier of a destination IP address, and an identifier of a source port number, and each of the statistical flow tables including a number of packets and a number of bytes of packets belonging to each statistical condition.

2. A method of taking statistics of multiple different statistical conditions for communication data flowing through a network, the communication data statistical method comprising:
   (a) receiving packets including multiple different identifiers;
   (b) classifying each packet, which is received in the step (a) and has corresponding identifiers identical with at least two preset different identifiers selected from the multiple different identifiers, into a certain aggregate flow, generating and accumulating aggregate statistical information including a number of packets belonging to the certain aggregate flow, and outputting the accumulated aggregate statistical information when the accumulated aggregate statistical information satisfies a preset output condition;
   (c) performing an updating process configured to update, in response to each receipt of the aggregate statistical information, multiple statistical flow tables corresponding to different statistical conditions defined by both a combination of a single identifier and a combination of identifiers that are part of the identifiers included in the aggregation flow, the combination of identifiers including at least two identifiers among an identifier of a source IP address, an identifier of a destination IP address, and an identifier of a source port number, and each of the statistical flow tables including a number of packets and a number of bytes of packets belonging to each statistical condition.

3. A non-transitory computer readable medium with an executable program stored thereon, wherein the executable program causes an apparatus to take statistics of multiple different statistical conditions for communication data flowing through a network, wherein the program comprises the functions of:

(a) receiving packets including multiple different identifiers;

(b) classifying each packet, which is received by the function (a) and has corresponding identifiers identical with at least two preset different identifiers selected among the multiple different identifiers, into a certain aggregate flow, generating and accumulating aggregate statistical information including a number of packets belonging to the certain aggregate flow, and outputting the accumulated aggregate statistical information when the accumulated aggregate statistical information satisfies a preset output condition;

(c) performing an updating process configured to update, in response to each receipt of the aggregate statistical information, multiple statistical flow tables corresponding to different statistical conditions defined by both a combination of a single identifier and a combination of identifiers that are part of the identifiers included in the aggregation flow, the combination of identifiers including at least two identifiers among an identifier of a source IP address, an identifier of a destination IP address, and an identifier of a source port number, and each of the statistical flow tables including a number of packets and a number of bytes of packets belonging to each statistical condition.

4. The apparatus in accordance with claim 1, wherein each of the at least two preset different identifiers and the corresponding identifier identical with at least one preset identifier are either one of flow address information or a flow condition.

5. The non-transitory computer readable medium in accordance with claim 3, wherein each of the at least two preset different identifiers and the corresponding identifier identical with at least one preset identifier are either one of flow address information or a flow condition.

6. The apparatus in accordance with claim 1, further comprising a storage unit that stores the statistical flow tables and an aggregation table including the aggregate statistical information related to the multiple different statistical conditions of the statistical flow tables.

* * * * *